US011703317B2

(12) United States Patent
Kendrick et al.

(10) Patent No.: US 11,703,317 B2
(45) Date of Patent: *Jul. 18, 2023

(54) HETERODYNE PHOTONIC INTEGRATED CIRCUIT FOR ABSOLUTE METROLOGY

(71) Applicant: RAYTHEON COMPANY, Waltham, MA (US)

(72) Inventors: Richard Lee Kendrick, San Mateo, CA (US); Joseph Marron, Manhattan Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/558,126

(22) Filed: Dec. 21, 2021

(65) Prior Publication Data

US 2022/0187055 A1 Jun. 16, 2022

Related U.S. Application Data

(63) Continuation of application No. 16/990,133, filed on Aug. 11, 2020, now Pat. No. 11,221,204.

(51) Int. Cl.
*G01B 9/02* (2022.01)
*G01B 9/02003* (2022.01)
(Continued)

(52) U.S. Cl.
CPC ..... *G01B 9/02051* (2013.01); *G01B 9/02003* (2013.01); *G01B 9/0207* (2013.01);
(Continued)

(58) Field of Classification Search
CPC ............ G01B 9/02051; G01B 9/02003; G01B 9/02008; G01B 9/02027; G01B 9/02049;
(Continued)

(56) References Cited

U.S. PATENT DOCUMENTS 6,947,621 B2  9/2005  Bell, Jr. et al.
7,003,186 B2  2/2006  Bell, Jr. et al.
(Continued)

FOREIGN PATENT DOCUMENTS

CA  3089801 A1  8/2019
EP  3106828 A1  12/2016

OTHER PUBLICATIONS

Imran Akca, B., et al., "Toward Spectral-Domain Optical Coherence Tomography on a Chip," IEEE Journal of Selected Topics in Quantum Electronics, (2012), vol. 18, No. 3, pp. 1223-1233.
(Continued)

*Primary Examiner* — Jonathan M Hansen
(74) *Attorney, Agent, or Firm* — Lando & Anastasi, LLP

(57) ABSTRACT

A digital measuring device implemented on a photonic integrated circuit, the digital measuring device including a laser source configured to provide light, a first ring resonator configured to produce a first frequency comb of light from the laser source, wherein at least a portion of the first frequency comb of light is directed at a moving object, a local oscillator configured to provide a reference beam, at least one waveguide structure configured to combine the reference beam with light reflected from the moving object to produce a measurement beam, a first multiplexer configured to split the measurement beam into a plurality of channels spaced in frequency, and a plurality of detectors configured to detect an intensity value of each channel of the plurality of channels to measure a distance between the digital measuring device and the moving object.

17 Claims, 11 Drawing Sheets

(51) Int. Cl.
  *G01B 9/02001* (2022.01)
  *G01B 9/02015* (2022.01)
  *G01B 9/02055* (2022.01)
  *G01B 11/14* (2006.01)
  *G01D 5/353* (2006.01)
  *G02B 6/125* (2006.01)

(52) U.S. Cl.
  CPC ..... *G01B 9/02008* (2013.01); *G01B 9/02027* (2013.01); *G01B 9/02028* (2013.01); *G01B 9/02049* (2013.01); *G01B 11/14* (2013.01); *G01D 5/35303* (2013.01); *G02B 6/125* (2013.01)

(58) Field of Classification Search
  CPC .............. G01B 9/0207; G01B 9/02007; G01B 9/02044; G01B 11/14; G01D 5/35303; G02B 6/125
  See application file for complete search history.

(56) References Cited

U.S. PATENT DOCUMENTS

| | | | |
|---|---|---|---|
| 9,816,840 B2 | 11/2017 | Roach et al. | |
| 10,168,137 B2 | 1/2019 | Martinez et al. | |
| 11,221,204 B1 * | 1/2022 | Kendrick | G01B 9/02007 |
| 2005/0190371 A1 | 9/2005 | Knuttel | |
| 2014/0085633 A1 * | 3/2014 | Preston | G01J 3/1895 |
| | | | 356/326 |
| 2014/0376000 A1 | 12/2014 | Swanson et al. | |
| 2019/0064358 A1 | 2/2019 | Desai et al. | |
| 2020/0166328 A1 | 5/2020 | Zhou | |
| 2020/0301071 A1 | 9/2020 | Nagarajan | |
| 2020/0363178 A1 | 11/2020 | Teig et al. | |
| 2020/0363187 A1 * | 11/2020 | Haverkamp | G01B 11/005 |
| 2021/0026223 A1 | 1/2021 | Stern et al. | |
| 2021/0124024 A1 | 4/2021 | Sarkissian et al. | |

OTHER PUBLICATIONS

International Search Report and Written Opinion in International Patent Application No. PCT/US2021/038118 dated Nov. 30, 2021.
International Search Report and Written Opinion in International Patent Application No. PCT/US2021/045214 dated Nov. 10, 2021.
International Search Report and Written Opinion in International Patent Application No. PCT/US2021/045378 dated Nov. 10, 2021.
Invitation to Pay Additional Fees and Communication regarding Partial Search Results in International Patent Application No. PCT/US2021/038118 dated Oct. 8, 2021.
Riemensberger, J., et al., "Massively parallel coherent laser ranging using a soliton microcomb," Nature, (2020), vol. 581, No. 7807, pp. 164-170.
Neimann, C., et al., "Silicon photonic integrated circuit for fast and precise dual-comb distance metrology," Optics Express, (2017), vol. 25, No. 24, pp. 30091-30104.

* cited by examiner

HETERODYNE PHOTONIC INTEGRATED CIRCUIT FOR ABSOLUTE METROLOGY

CROSS REFERENCE TO RELATED APPLICATIONS

This application claims priority under 35 U.S.C. § 120 as a continuation of U.S. patent application Ser. No. 16/990,133, titled "HETERODYNE PHOTONIC INTEGRATED CIRCUIT FOR ABSOLUTE METROLOGY," filed Aug. 11, 2020, which is incorporated by reference herein in its entirety for all purposes.

BACKGROUND

1. Field

Embodiments of the disclosure relate generally to photonic integrated circuits (IC) and more particularly photonic ICs configured as digital measuring devices.

2. Discussion of Related Art

As is known in the art, non-contact position sensors can be used to provide position measurements in a variety of applications. Some types of non-contact position sensors utilize electromagnetic fields and/or currents to determine the position of targets/objects. In many cases, such position sensors provide limited angular range and resolution performance. In some cases, free space optical systems can be used as position sensors to provide improved angular range and resolution performance; however, such systems are often too large or heavy for many applications.

SUMMARY

At least one aspect of the present disclosure is directed to a digital measuring device implemented on a photonic integrated circuit, the digital measuring device. The digital measuring device includes a laser source implemented on the photonic integrated circuit configured to provide light, a first ring resonator implemented on the photonic integrated circuit configured to produce a first frequency comb of light from the laser source, wherein at least a portion of the first frequency comb of light is directed at a moving object, a local oscillator implemented on the photonic integrated circuit configured to provide a reference beam, at least one waveguide structure implemented on the photonic integrated circuit configured to combine the reference beam with light reflected from the moving object to produce a measurement beam, a first multiplexer implemented on the photonic integrated circuit configured to split the measurement beam into a plurality of channels spaced in frequency, and a plurality of detectors implemented on the photonic integrated circuit configured to detect an intensity value of each channel of the plurality of channels to measure a distance between the digital measuring device and the moving object.

In one embodiment, the intensity values detected by the plurality of detectors are provided to a controller configured to measure the distance between the digital measuring device and the moving object. In some embodiments, the first ring resonator, the local oscillator, the at least one waveguide structure, the first multiplexer, and the plurality of detectors are configured as a heterodyne interferometer.

In certain embodiments, the laser source and the plurality of detectors are disposed on a first substrate of the photonic integrated circuit. In one embodiment, the first substrate is an Indium Phosphide (InP) substrate. In various embodiments, the first ring resonator, the local oscillator, the at least one waveguide structure, and the first multiplexer are integrated with the laser source and the plurality of detectors on the first substrate. In some embodiments, the first ring resonator, the local oscillator, the at least one waveguide structure, and the first multiplexer are integrated on a second substrate of the photonic integrated circuit. In one embodiment, the second substrate is a Silicon Nitride (SiN) substrate.

In some embodiments, an edge of the first substrate is coupled to an edge of the second substrate. In certain embodiments, light is directed between the first and second substrates via one or more mirrors included in the edges of the first and second substrates.

In one embodiment, the local oscillator includes a second ring resonator and the reference beam corresponds to a second frequency comb of light produced by the second ring resonator from the laser source. In some embodiments, the first ring resonator is tuned with a first frequency offset value and the second ring resonator is tuned with a second frequency offset value, the second frequency offset value being different than the first frequency offset value. In various embodiments, the local oscillator includes a second multiplexer and the reference beam corresponds to a portion of the first frequency comb of light combined by the second multiplexer. In certain embodiments, the moving object is a mirror included in a fast steering mirror assembly.

Another aspect of the present disclosure is directed to a method for monitoring the position of a moving object using a digital measuring device implemented on a photonic integrated circuit. The method includes providing light from a laser source implemented on the photonic integrated circuit, producing a first frequency comb of light from the laser source using a first ring resonator implemented on the photonic integrated circuit, directing at least a portion of the first frequency comb of light at the moving object, producing a reference beam using a local oscillator implemented on the photonic integrated circuit, combining the reference beam and light reflected from the moving object to produce a measurement beam, splitting the measurement beam into a plurality of channels spaced in frequency using a first multiplexer implemented on the photonic integrated circuit, and detecting an intensity value of each channel of the plurality of channels using a plurality of detectors implemented on the photonic integrated circuit.

In one embodiment, the method includes providing the intensity values detected by the plurality of detectors to a controller configured to measure the distance between the digital measuring device and the moving object. In some embodiments, the first ring resonator, the local oscillator, the first multiplexer, and the plurality of detectors are configured as a heterodyne interferometer on the photonic integrated circuit.

In certain embodiments, producing the reference beam using the local oscillator further includes producing a second frequency comb of light from the laser source using a second ring resonator implemented on the photonic integrated circuit. In various embodiments, the first ring resonator is tuned to a first frequency offset value and the second ring resonator is tuned to a second frequency offset value, the second frequency offset value being different than the first frequency offset value. In some embodiments, producing the reference beam using the local oscillator further includes using a second multiplexer implemented on the photonic integrated circuit to combine a portion of the first frequency comb of light to produce the reference beam.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

As discussed above, non-contact position sensors can be used to provide position measurements in a variety of applications. Some types of non-contact position sensors utilize electromagnetic fields and/or currents to determine position measurements of targets/objects. For example, one or more eddy current sensors can be configured as a non-contact position sensor to monitor the position of an object. The one or more eddy current sensors are configured to sense currents corresponding to movement of the object to determine position measurements. While these types of non-contact position sensors can provide acceptable position monitoring for some applications, in many cases the performance of such sensors is inadequate. For example, the position measurement range of typical eddy current sensors may be limited to an angular range of ±2 degrees with a resolution of 200 nanoradians.

In some cases, different types of non-contact position sensors can be utilized to provide improved performance. For example, a free space optical system may be configured as non-contact position sensor to provide a larger angular range with improved resolution; however, typical free space optical systems are too large or heavy for many applications (e.g., flight and space applications).

Accordingly, an improved, compact non-contact position sensor is provided herein. In at least one embodiment, a multi-wavelength digital measuring device including a heterodyne interferometer is implemented on a photonic integrated circuit and configured to monitor the position of a moving object. In some examples, the digital measuring device is configured to monitor the position of a mirror included in a fast steering mirror (FSM) assembly.

Figure 1A:
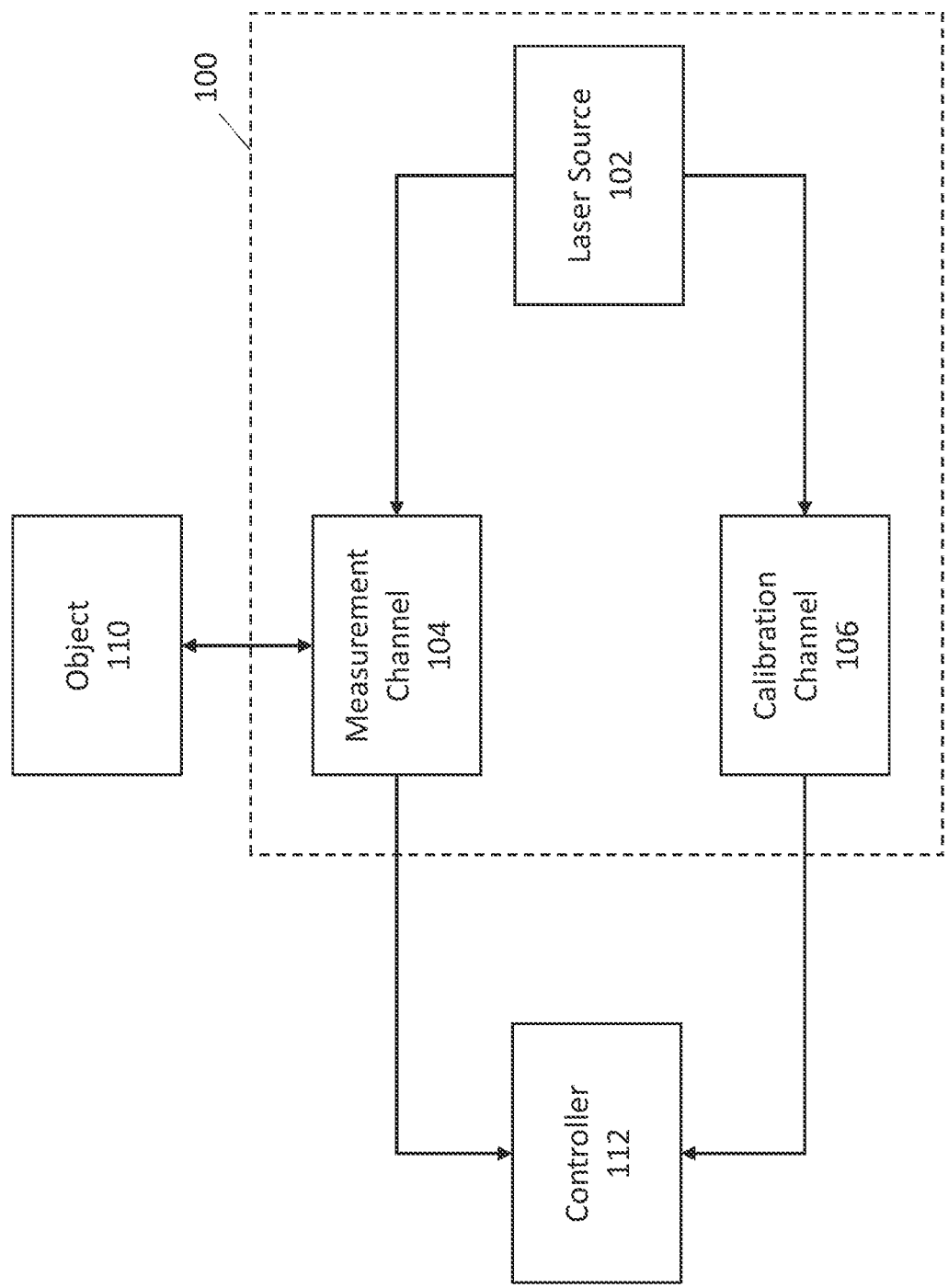
FIG. 1A is a block diagram illustrating a digital measuring device assembly in accordance with aspects described herein.

FIG. 1A illustrates a functional block diagram of a digital measuring device 100 in accordance with aspects described herein. The digital measuring device 100 includes a laser source 102, a measurement channel 104, and a calibration channel 106. As shown, the digital measuring device 100 is configured to monitor the position of a moving object 110. In one example, the measurement channel 104 and the calibration channel 106 are coupled to a controller 112. In some examples, the controller 112 is external to the digital measuring device 100; however, in other examples, the controller 112 may be included in the digital measuring device 100.

In one example, the laser source 102 is multi-wavelength laser diode. In some examples, the laser source 102 is configured to provide light with wavelengths between 30-50 nanometers. In other examples, the laser source 102 may be a different type of laser source and/or configured to provide light having different wavelengths. For example, the laser source 102 may be an Indium Phosphide (InP) pump laser.

In various examples, the controller 112 may include one or more general computing processors, specialized processors, or microcontrollers. The controller 112 may include programmed, special-purpose hardware, for example, an application-specific integrated circuit (ASIC), or more generally designed hardware, such as a field programmable gate array (FPGA) or a general-purpose processor. In one example, the controller 112 may include one or more memory devices, such as a disk drive, memory, flash memory, embedded or on-chip memory, or other device for storing data.

Figure 1B:
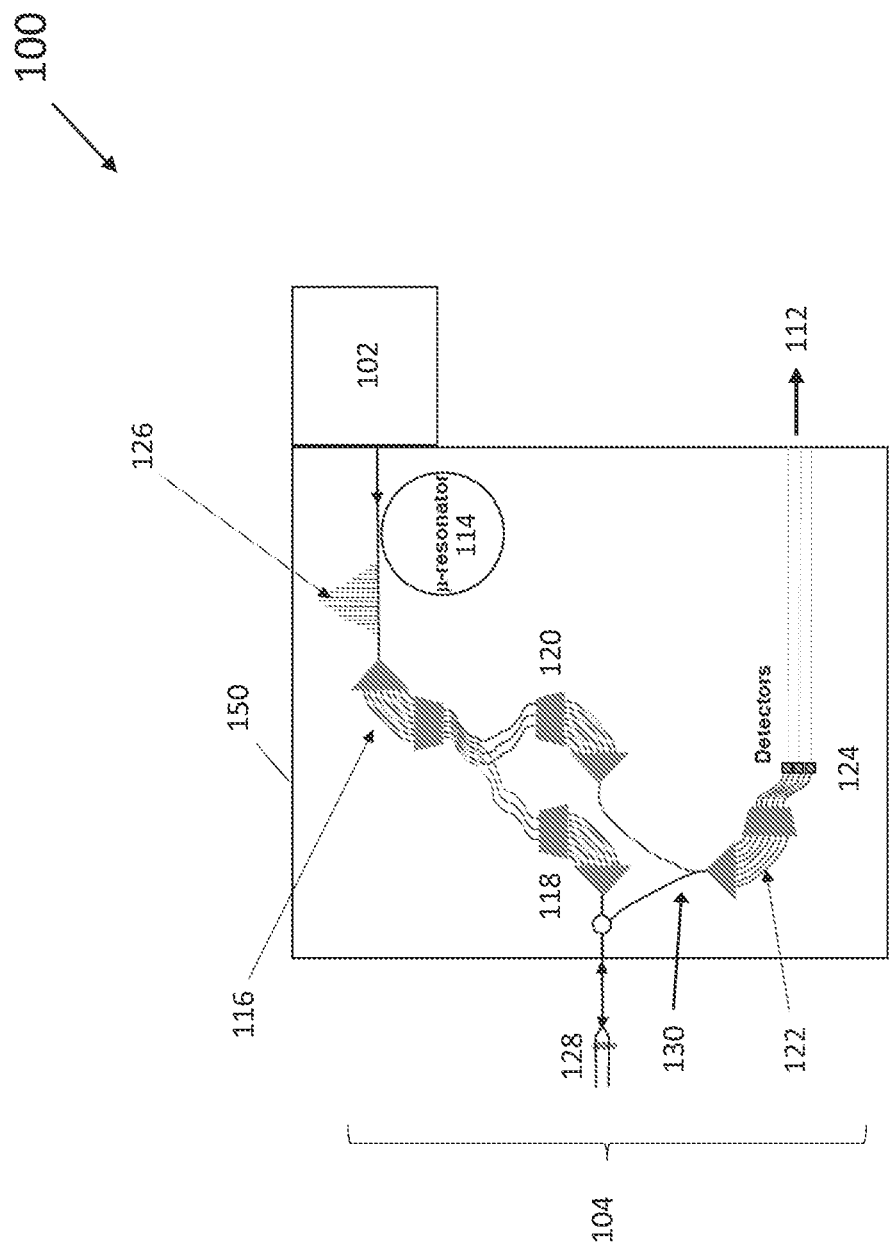
FIG. 1B is a schematic diagram illustrating a digital measuring device in accordance with aspects described herein.

FIG. 1B illustrates a schematic diagram of the digital measuring device 100 in accordance with aspects described herein. As shown, the digital measuring device 100 is implemented on a photonic integrated circuit (PIC) 150. In one example, the PIC 150 includes a single substrate; however, in other examples, the PIC 150 may include two or more substrates, as described in greater detail herein.

In one example, the measurement channel 104 is configured as a heterodyne interferometer to provide multi-wavelength distance measurements. The measurement channel 104 includes a ring resonator 114, a first arrayed waveguide grating (AWG) device 116, a second AWG device 118, a third AWG device 120, a fourth AWG device 122, and a plurality of detectors 124. In some examples, one or more waveguide structures are integrated on the PIC 150 to couple the components described above. For example, the second AWG device 118, the third AWG device 120, and the fourth AWG device 122 are coupled together via a waveguide structure 130.

In one example, the ring resonator 114 is a frequency comb ring resonator (or micro ring resonator) that is thermally tuned with a desired frequency offset (e.g., 10 GHz). In some examples, the ring resonator 114 includes a looped optical waveguide structure and a coupling mechanism. The looped optical waveguide structure induces a phase shift corresponding to the desired frequency offset, allowing light to interfere at the coupling mechanism to produce a frequency comb. In this context, "frequency comb" refers to a spectrum of light including discrete, equally spaced frequency content. As such, light is provided from the laser source 102 to the ring resonator 114 to produce a frequency comb 126. The frequency comb 126 includes a frequency spacing corresponding to the frequency offset of the ring resonator 114 (e.g., 10 GHz).

The first AWG device 116 is configured to receive the frequency comb 126 and de-multiplex the frequency comb 126 into a first plurality of channels. In one example, the first AWG device 118 is configured to provide the first plurality of channels with a uniform frequency spacing corresponding to the spacing of the frequency comb 126 (i.e., the frequency offset of the ring resonator 114). In other examples, the first AWG device 118 can be configured with a different frequency spacing.

In one example, a first channel group of the first plurality of channels is provided to the second AWG device 118 and a second channel group of the first plurality of channels is provided to the third AWG device 120. In some examples, the first and second channel groups each correspond to half of the first plurality of channels. For example, every other channel (e.g., first, third, etc.) of the first plurality of channels may be provided to the second AWG device 118 as the first channel group. Likewise, the remaining channels (e.g., second, fourth, etc.) may be provided to the third AWG device 120 as the second channel group. As such, the frequency content of the second channel group may appear shifted in frequency relative to the frequency content of the first channel group. In some examples, the second and third AWG devices 118, 120 are configured with a larger frequency spacing (e.g., 20 GHz) corresponding to the effective frequency spacings of the first and second channel groups.

The second AWG device 118 is configured to receive and combine the first channel group into a first beam of light. In one example, the second AWG device 118 is coupled to a collimating optic device 128 that directs the first beam of light off the PIC 150 towards the moving object 110. In some examples, the moving object 110 includes a retro device (i.e., reflector) configured to return a reflected beam of light to the collimating optic device 128. As shown, the reflected beam is provided from the collimating optic device 128 to the fourth AWG device 122 via the waveguide structure 130.

Likewise, the third AWG device 120 is configured to receive and combine the second channel group into a second beam of light. In one example, the third AWG device 120 is configured as a local oscillator and the second beam of light corresponds to a reference beam. In some examples, the reference beam is provided from the third AWG device 120 to the fourth AWG device 122 via the waveguide structure 130 to interfere with the reflected beam from the collimating optic device 128. As such, the reflected beam and the reference beam combine to produce a measurement beam, and the measurement beam is provided to the fourth AWG device 122.

The fourth AWG device 122 is configured to receive the measurement beam and de-multiplex the measurement beam into a second plurality of channels. In one example, the fourth AWG device 122 is configured to provide a plurality of channels having a uniform frequency/wavelength spacing; however, in other examples, the fourth AWG device 122 can be configured with a non-uniform frequency/wavelength spacing. In some examples, the spacing of the plurality of channels is selected to provide a desired ambiguity interval using equation (1) below:

$$\text{Ambiguity Interval} = c/\Delta v_{increment} \quad (1)$$

where, c is the speed of light and $\Delta v_{increment}$ is the minimum frequency separation between channels (i.e., spacing). In one example, the ambiguity interval corresponds to the absolute metrology distance measurement capability of the measurement channel 104 (i.e., the heterodyne interferometer). For example, the fourth AWG device 122 can be configured with a spacing of 20 GHz between channels to provide a measurement capability of ±15 millimeters (mm). In other examples, the fourth AWG device 122 can be configured to provide different ranges of measurement capability (e.g., 10 mm, 30 mm, etc.). In one example, a 20 GHz channel spacing corresponds to a channel width of approximately 1 Angstrom at a 1.3 micron wavelength. In other examples, the fourth AWG device 122 may be configured with a different ambiguity interval, channel width, and/or center wavelength. In certain examples, the configuration of the fourth AWG device 122 corresponds to the capabilities (i.e., frequency range) of the laser source 102.

In one example, the plurality of channels of the fourth AWG device 122 are connected to a plurality of detectors 124. For example, each channel of the plurality of channels may be connected a corresponding detector of the plurality of detectors 124. In some examples, the plurality of detectors 124 are high speed Indium Phosphide (InP) detectors configured to detect the intensity of each channel (i.e., fringe intensity). In other examples, the plurality of detectors 124 may be different types of detectors (e.g., Indium Gallium Arsenide (InGaAs)). As shown, the outputs of the plurality of detectors 124 are provided to the controller 112 for processing to determine the position of the moving object 110.

While not shown, the calibration channel 106 may also be included on the PIC 150 and configured as an interferometer (heterodyne or another configuration). In certain examples, the calibration channel 106 is configured to include one or more National Institute of Standards and Technology (NIST) traceable references. For example, one or more waveguide structures may be configured with known lengths and/or spacings in accordance with NIST standards. In some examples, measured intensity values are provided from the calibration channel 106 to the controller 112 to determine calibration coefficients or weights for the measurement channel 104. In some examples, the coefficients or weights may correspond to a frequency response of the PIC 150.

As described above, the measurement channel 104 of the digital measuring device 100 includes a single ring resonator (i.e., ring resonator 114) and several AWG devices; however, in other examples, the digital measuring device 100 may be configured differently.

Figure 2:
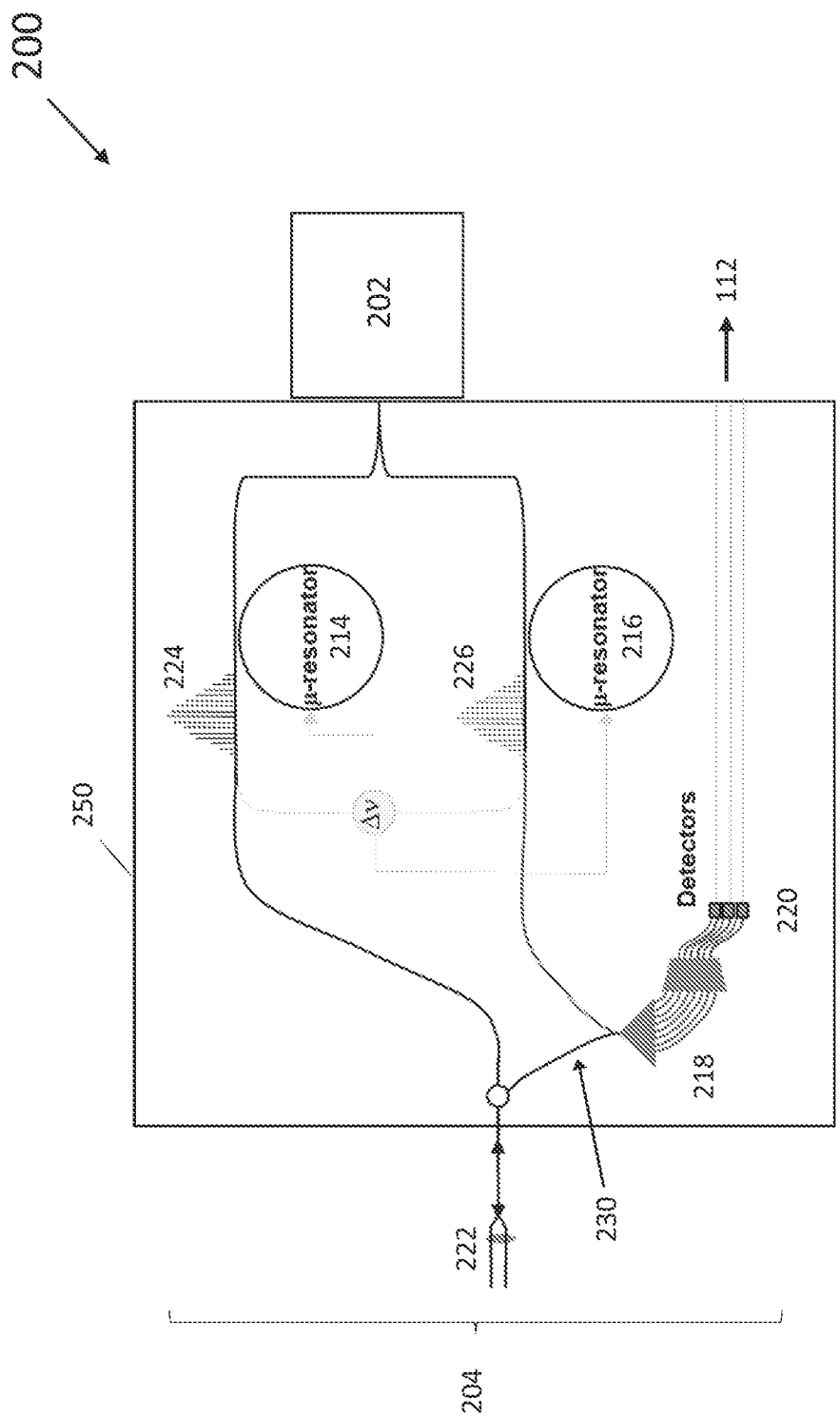
FIG. 2 is a schematic diagram illustrating a digital measuring device in accordance with aspects described herein.

FIG. 2 illustrates a schematic diagram of a digital measuring device 200 in accordance with aspects described herein. In one example, the digital measuring device 200 includes a laser source 202 and a measurement channel 204. As shown, the digital measuring device 200 is implemented on a PIC 250. In some examples, the PIC 250 corresponds to the PIC 150 of the digital measuring device 100. While not shown, the digital measuring device 200 may include a calibration channel (e.g., calibration channel 106) implemented on the PIC 250.

In one example, the measurement channel 204 is configured as a heterodyne interferometer to provide multi-wavelength distance measurements. The measurement channel 204 includes a first ring resonator 214, a second ring resonator 216, an AWG device 218, and a plurality of detectors 220. In some examples, one or more waveguide structures are integrated on the PIC 250 to couple the components described above. For example, the first ring resonator 214, the second ring resonator 216, and the AWG device 218 are coupled together via a waveguide structure 230.

The first ring resonator 214 is a frequency comb ring resonator that is thermally tuned with a first frequency offset. In one example, light is provided from the laser source 202 to the first ring resonator 214 to produce a first frequency comb 224 with a spacing that corresponds to the first frequency offset. In some examples, the first frequency comb 224 corresponds to a first beam of light. Likewise, the second ring resonator 216 is a frequency comb ring resonator that is thermally tuned with a second frequency offset. Light is provided from the laser source 202 to the second ring resonator 216 to produce a second frequency comb 226 with a spacing that corresponds to the second frequency offset. In some examples, the second ring resonator 216 is configured as a local oscillator and the second frequency comb 226 corresponds to a reference beam.

In one example, the first frequency offset of the first ring resonator 214 is different than the second frequency offset of the second ring resonator 216. In some examples, the frequency separation between the first and second frequency offsets can be reduced to provide low bandwidth detection capabilities.

In one example, the first ring resonator 214 is coupled to a collimating optic device 222 to direct the first beam of light (i.e., the first frequency comb 224) off the PIC 150 towards the moving object 110. In some examples, the moving object 110 includes a retro device (i.e., reflector) configured to return a reflected beam of light to the collimating optic device 222. The reflected beam is provided from the collimating optic device 222 to the AWG device 218 via the waveguide structure 230.

Likewise, the second ring resonator 216 is coupled to the AWG device 218 and provides the reference beam (i.e., the second frequency comb 226) to the AWG device 218. In some examples, the reference beam is provided from the second ring resonator 216 to the AWG device 218 via the waveguide structure 230 to interfere with the reflected beam from the collimating optic device 222. As such, the reflected beam and the reference beam combine to produce a measurement beam, and the measurement beam is provided to the AWG device 218.

The AWG device 218 is configured to receive the measurement beam and de-multiplex the measurement beam into a plurality of channels. In one example, the AWG device 218 is configured to provide a plurality of channels having a uniform frequency/wavelength spacing; however, in other examples, the AWG device 218 can be configured with a non-uniform frequency/wavelength spacing. As described above, the spacing of the plurality of channels is selected to provide a desired ambiguity interval corresponding to the absolute metrology distance measurement capability of the measurement channel 204. In some examples, the AWG device 218 is configured with a channel spacing corresponding to a delta frequency between the first and second frequency combs 224, 216.

In one example, the plurality of channels of the AWG device 218 are connected to the plurality of detectors 220. For example, each channel of the plurality of channels may be connected a corresponding detector of the plurality of detectors 220. In some examples, the plurality of detectors 220 are high speed Indium Phosphide (InP) detectors configured to detect the intensity of each channel (i.e., fringe intensity). In other examples, the plurality of detectors 220 may be different types of detectors (e.g., Indium Gallium Arsenide (InGaAs)). The outputs of the plurality of detectors 220 are provided to the controller 112 for processing to determine the position of the moving object 110.

Figure 3:
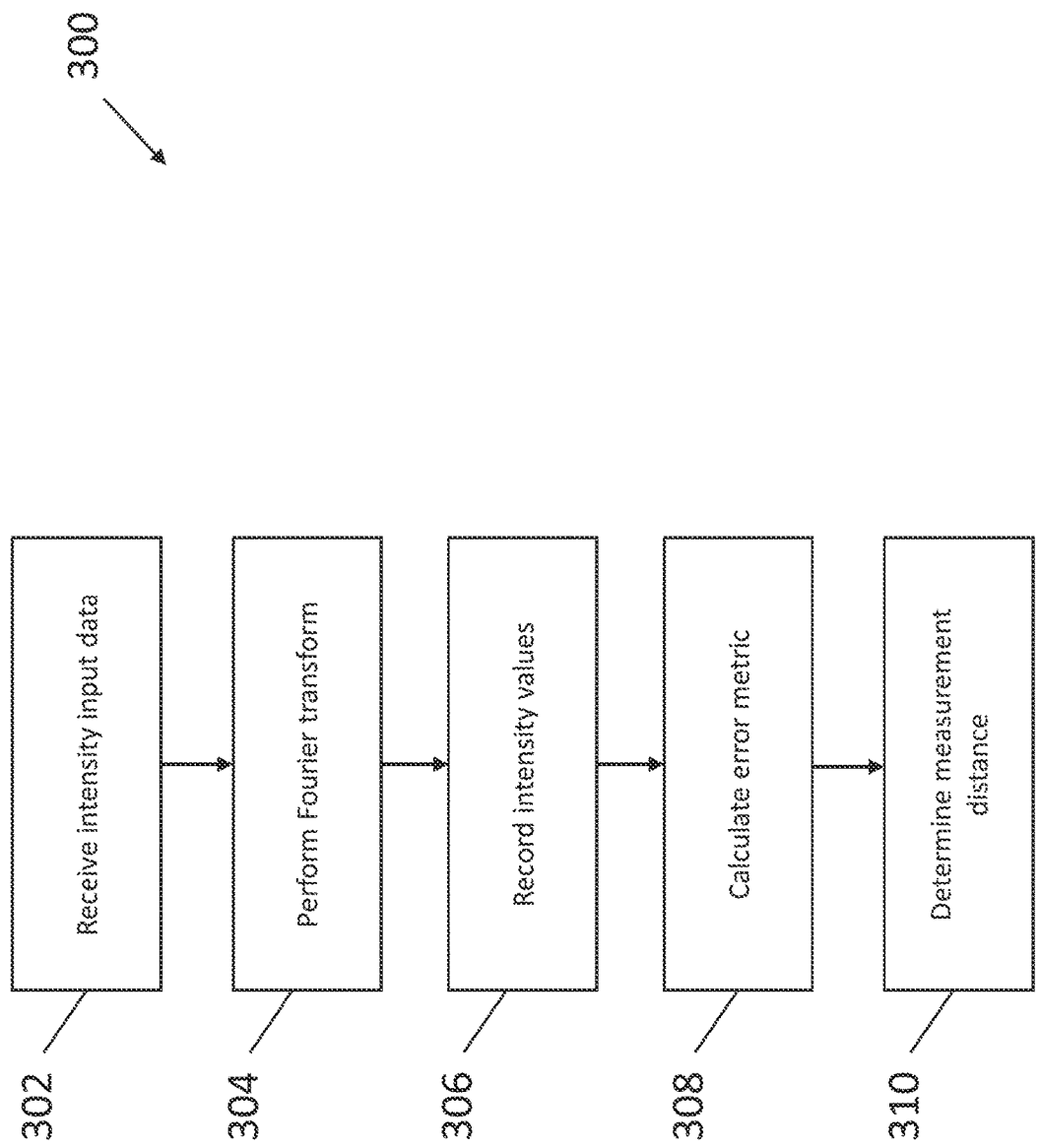
FIG. 3 is a flow diagram illustrating a method of processing intensity data from a digital measuring device in accordance with aspects described herein.

FIG. 3 illustrates a method 300 for processing intensity data from a digital measuring device to monitor the position of a moving object in accordance with aspects described herein. In one example, the method 300 can be used to monitor the position of the moving object 110 using the digital measuring device 100 of FIGS. 1A and 1B (or the digital measuring device 200 of FIG. 2).

At block 302, the controller 112 receives measurement intensity data from the measurement channel 104 and calibration intensity data from the calibration channel 106.

At block 304, the controller 112 is configured to perform a Fourier transform to convert the received measurement and calibration intensity data into the frequency domain. In one example, in order to perform the Fourier transform, the controller 112 is configured to sample the time domain intensity data using a sample rate corresponding to the wavelength(s) of the light provided by laser source 102. For example, the controller 112 may be configured to sample the intensity data using a 20 kHz sample rate; however, in other examples, the controller 112 may be configured to use a different sample rate (e.g., up to 50 GHz). In some examples, the Fourier transform of the measurement intensity data produces a peak in the frequency domain that increases in frequency as the measurement distance from the moving object 110 increases.

Figure 4A:
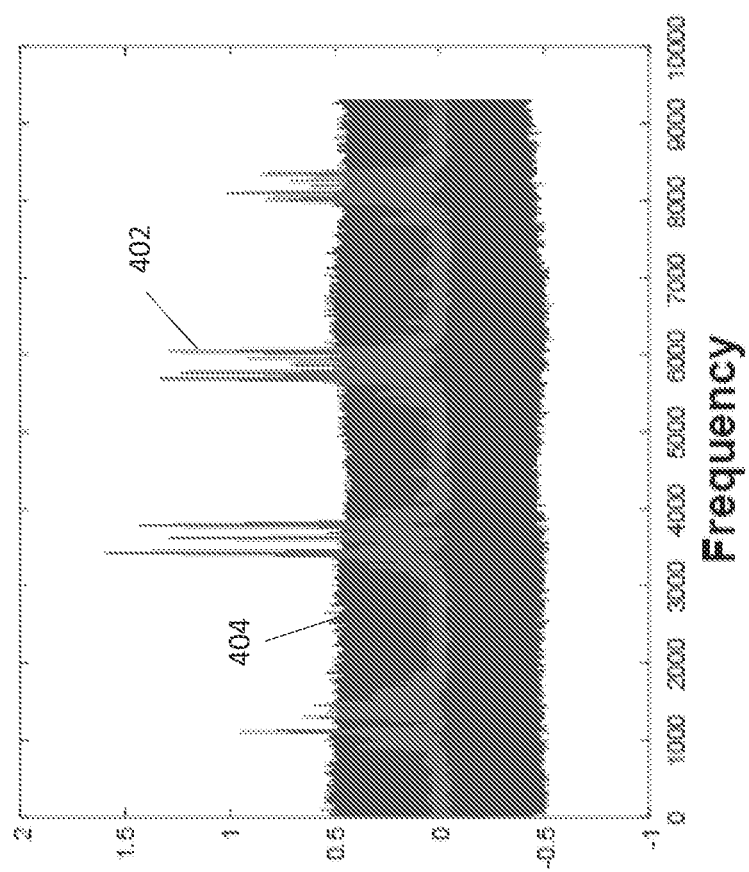
FIG. 4A is a graph illustrating intensity data from a digital measuring device in accordance with aspects described herein.

FIG. 4A illustrates example frequency domain representations of the measurement and calibration intensity data described above. In one example, the measurement signal 402 corresponds to the frequency domain representation of the measurement intensity data. As shown, the measurement signal 402 includes variations in frequency content that correspond to the position of the moving object 110 (i.e., distance from the digital measuring device 100).

Likewise, the calibration signal 404 corresponds to the frequency domain representation of the calibration intensity data. In one example, the calibration signal 404 includes variations in frequency content that correspond to the frequency response of the digital measuring device 100 and/or the PIC 150. As described above, the variations may be used to determine calibration coefficients or weights that can be applied to the measurement signal 402. In some examples, the values of the calibration coefficients are selected such that any non-uniform characteristics or non-linearities inherent to the frequency response of the digital measuring device 100 and/or PIC 150 are accounted for in the measurement intensity data (i.e., the measurement signal 402).

In certain examples, the controller 112 is configured to calculate and apply the calibration coefficients at a predetermined or adjustable time interval. For example, the controller 112 may be configured to periodically update the calibration coefficients to account for environmental changes (e.g., temperature, altitude, etc.) and operational characteristics of the digital measuring device 100 (e.g., thermal profile). In other examples, the controller 112 can be configured to update the calibration coefficients corresponding to one or more specific events (e.g., power on, post-fabrication testing, etc.).

In some examples, the measurement signal 402 is used to determine an initial distance estimate. For example, the peak amplitude and/or frequency of the measurement signal 402 may be compared to a reference amplitude and/or frequency corresponding to a known reference distance. In some examples, the measurement signal 402 may be compared to one or more pre-determined reference distances stored by the controller 112 (i.e., in memory).

At block 306, the controller 112 records the intensity values for each channel from the Fourier transform output. In one example, the intensity value of each channel is a fringe intensity value at a particular phase. As such, the intensity values may change as a function of wavelength, providing a sinusoidal signal (i.e., the measurement signal 402) across the plurality of channels representing the measurement distance. In some examples, the sinusoidal signal across the plurality of channels corresponds to an intensity pattern. In certain examples, each distance value within the ambiguity interval of the distance measuring device (e.g., 15 mm) may correspond to a unique intensity pattern.

Figure 4B:
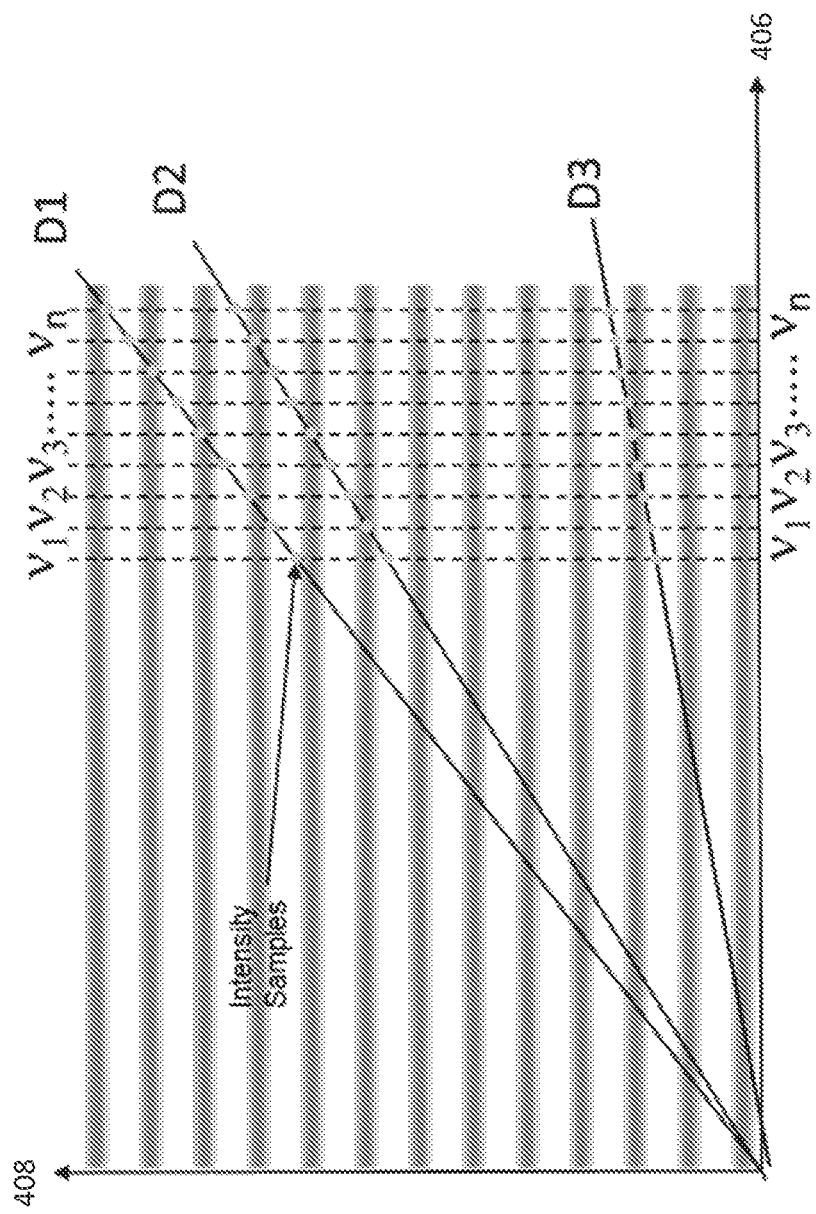
FIG. 4B is a graph illustrating intensity patterns from a digital measuring device in accordance with aspects described herein.

FIG. 4B illustrates examples of intensity patterns for a first distance D1, a second distance D2, and a third distance D3. In one example, the first distance D1 is the longest distance and D3 is the shortest distance. The horizontal axis 406 represents frequency and the vertical axis 408 represents intensity. Likewise, the alternating dark and light horizontal bars indicate phase. As shown, the intensity values can be recorded for each frequency/channel ($v_n$) to produce unique intensity patterns corresponding to each of the distances D1-D3.

At block 308, the recorded intensity values are correlated to calculated sinusoidal intensity values to determine a final distance estimate. In one example, the intensity values are correlated using an error metric given by equation (2) below:

$$E(D') = \frac{\sum_{n=1}^{N} I_n \cos\left(\frac{4\pi}{c} D' v_n\right)}{\sqrt{\sum_{n=1}^{N} I_n^2} \sqrt{\sum_{n=1}^{N} \cos^2\left(\frac{4\pi}{c} D' v_n\right)}} \quad (2)$$

where, N is the total number of channels (e.g., 100), $v_n$ is the frequency of each channel, $I_n$ is the measured/recorded intensity value of each channel, and D' is a distance value. The calculated sinusoidal intensity values are represented by the cosine term in the numerator.

In one example, equation (2) can be solved iteratively by substituting in a plurality of distance values for D' to produce an error distribution over a distance range. The step size between each of the plurality of distance values may correspond to the configuration of the digital measuring device 100 (e.g., ambiguity interval, number of channels, etc.). In some examples, a high-resolution step size corresponding to the configuration of the digital measuring device 100 is used to provide an error distribution with nanometer precision. In certain examples, the error distribution can be interpolated between distance values to provide even higher resolutions.

In some examples, the error distribution is calculated over a distance value range corresponding to the full measurement range of the digital measuring device 100. In other examples, the error distribution is calculated over a subset of the full measurement range. For example, the controller 112 may be configured to calculate the error distribution over an optimized (i.e., narrower) distance value range corresponding to the initial distance estimate (block 304). In some examples, calculating the error distribution over the optimized distance value range can reduce processing time and calculational complexity.

Figure 4C:
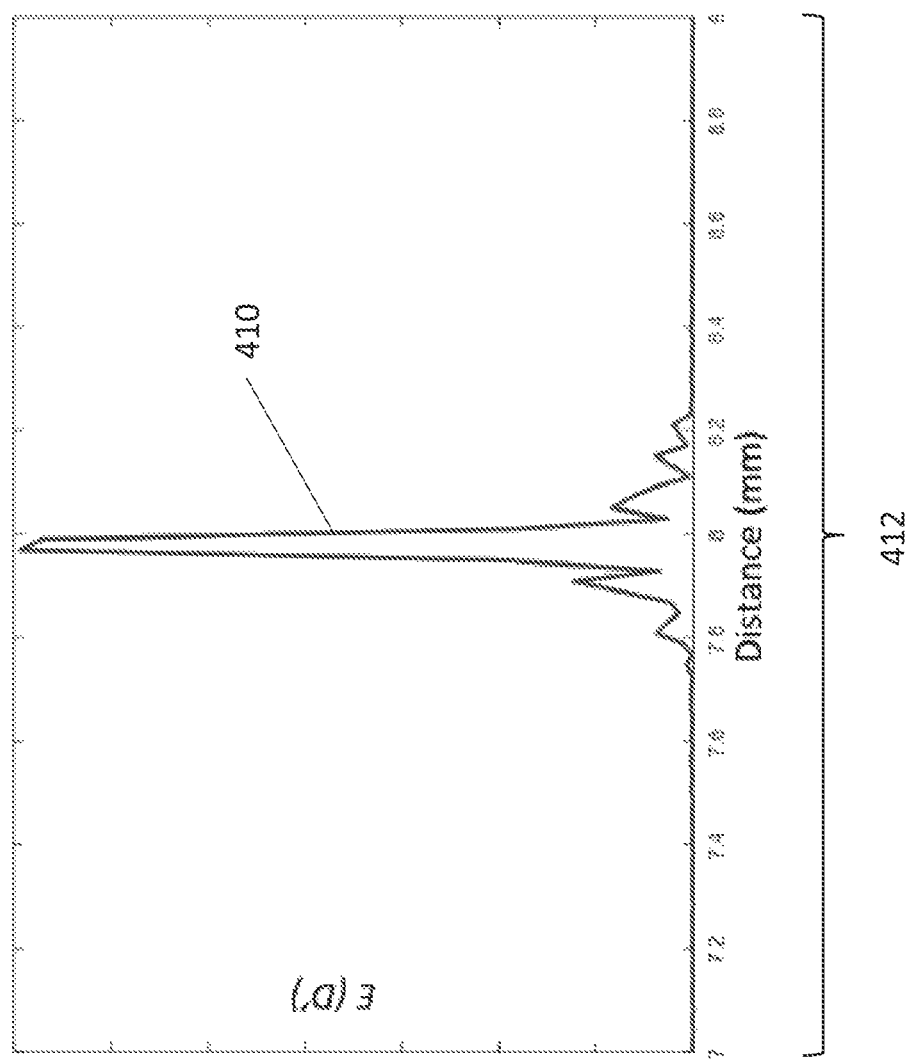
FIG. 4C is a graph illustrating an error distribution corresponding to intensity data from a digital measuring device in accordance with aspects described herein.

FIG. 4C illustrates an example error distribution 410 in accordance with aspects described herein. In one example, the error distribution 410 is calculated over an optimized distance value range 412. As shown, the optimized distance value range 412 spans from 7 mm to 9 mm and may correspond to an initial distance estimate of 8 mm. As described above, in other examples, the error distribution 410 may be calculated over the full measurement range of the digital measuring device 100 (e.g., 0 mm to 15 mm).

Figure 4D:
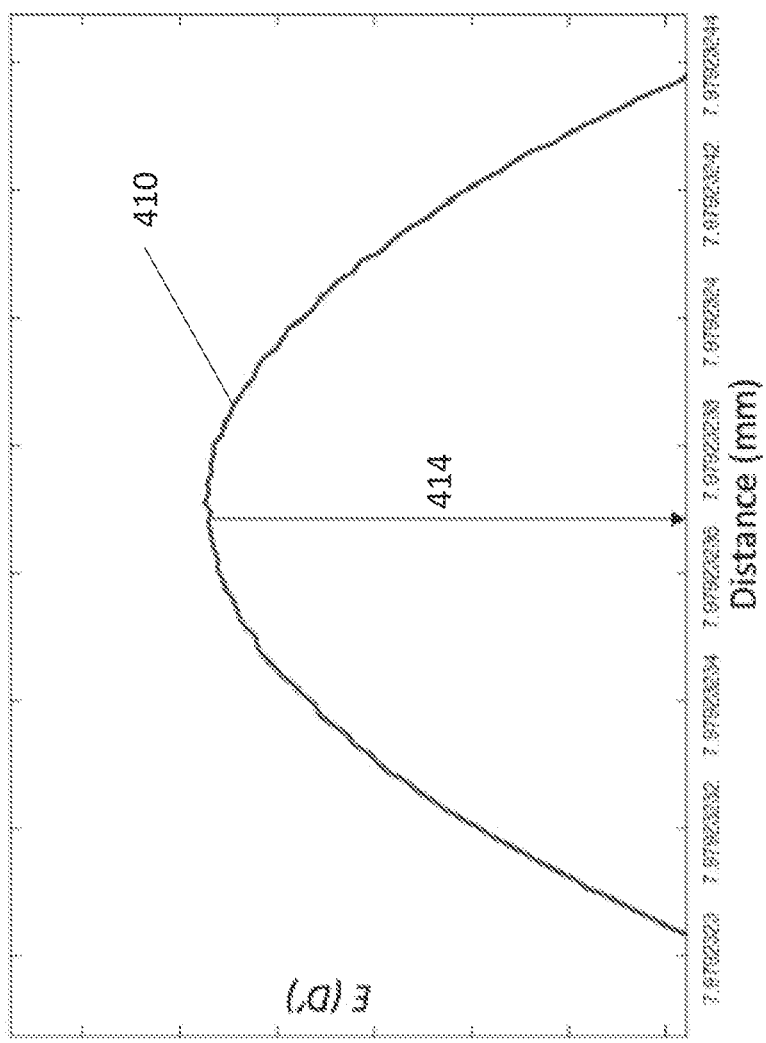
FIG. 4D is a graph illustrating the peak of an error distribution corresponding to intensity data from a digital measuring device in accordance with aspects described herein.

At block 310, the calculated error distribution is analyzed to determine the final distance estimate. In some examples, the final distance estimate is determined based on the peak of the calculated error distribution. FIG. 4D illustrates a close-up view of the peak of the error distribution 410. As shown, the peak of the error distribution 410 can be utilized to determine the final distance estimate (indicated at 414) with nanometer precision.

In some examples, the method 300 is repeated to monitor the position of the moving object 110 in real-time. For example, the controller 112 may be configured to continuously receive measurement intensity data from the digital measuring device 100 and re-calculate distance estimates indicating the position of the moving object 110 relative to the digital measuring device 100.

In one example, the digital measuring device 100 is configured to operate over a larger angular range with a higher resolution compared to other types of non-contact position sensors (e.g., current-based sensors). For example, the digital measuring device 100 may provide an angular range of ±5 degrees with a resolution of 10 nanoradians. As such, the digital measuring device 100 can provide significant performance improvements (e.g., 10×) compared to other types of non-contact position sensors.

As described above, the digital measuring device 100 is implemented on the PIC 150. In one example, the PIC 150 corresponds to a single Indium Phosphide (InP) substrate on which the active and passive components of the digital measuring device 100 are fabricated, integrated, and/or disposed. In some examples, the PIC 150 corresponds to a single substrate made from a different material (e.g., Silicon Nitride (SiN)). In other examples, the PIC 150 can include two or more substrates on which the active and passive components of the digital measuring device 100 are fabricated, integrated, and/or disposed.

Figure 5:
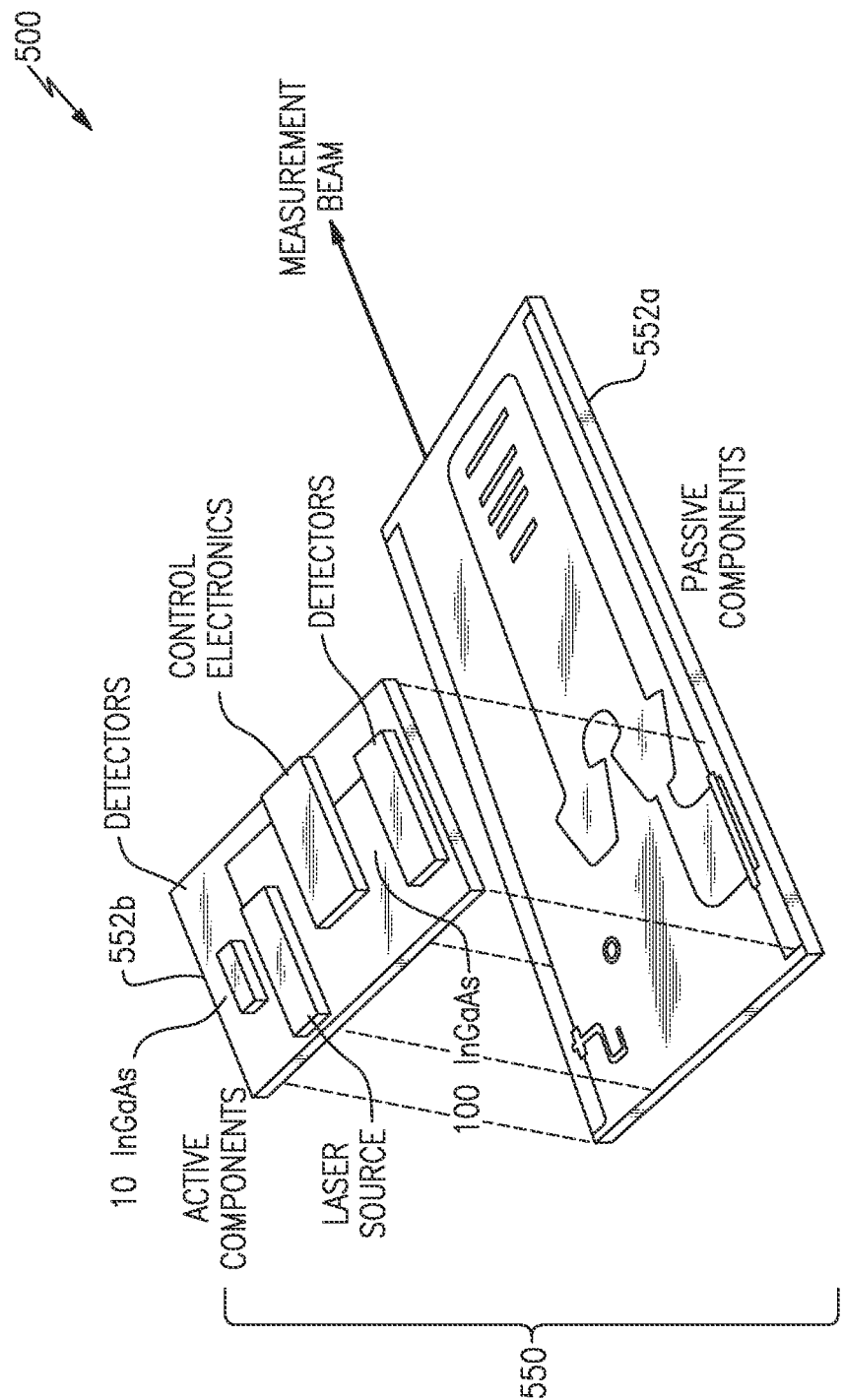
FIG. 5 is a diagram illustrating a digital measuring device in accordance with aspects described herein.

FIG. 5 illustrates a digital measuring device 500 implemented on a photonic integrated circuit including multiple substrates in accordance with aspects described herein. In one example, the digital measuring device 500 corresponds to the digital measuring device 100 of FIGS. 1A and 1B (or the digital measuring device 200 of FIG. 2).

As shown, the digital measuring device 500 is implemented on a PIC 550 including a first substrate 552*a* and a second substrate 552b. In one example, the first substrate 552a is dedicated to passive components (e.g., the ring resonator 114, the AWG devices 116-122, etc.). In some examples, the first substrate 552a is made from Silicon Nitride (SiN). As such, the waveguide structures of the passive components can be fabricated (i.e., patterned) on the surface of the first substrate 552a. In other examples, the first substrate may be made from a different material (e.g., Si) and the passive components are defined by patterning a photonic material on the surface of the first substrate 552a.

Likewise, the second substrate 552b may be dedicated to active components (e.g., the laser source 102, the plurality of detectors 124, etc.). In some examples, the second substrate 552b includes control devices (i.e., the controller 112). In one example, the second substrate 552b is made from InP and the active components are disposed on the surface of the second substrate 552b. In other examples, the second substrate 552b can be made from a different material (e.g., Si).

The first substrate 552a and the second substrate 552b may be coupled together, allowing light to be directed between the passive and active components. In one example, an edge of the first substrate 552a is coupled to an edge of the second substrate 552b. In some examples, the edges are coupled together via angled facets (e.g., 45 degrees) including mirrors configured to direct light between the substrates 552a, 552b. In certain examples, the substrates 552a, 552b can be mounted, attached, and/or bonded to another substrate or platform to provide structural support as needed. In other examples, the second substrate 552b can be mounted, attached, and/or bonded to the surface of the first substrate 552a and one or more mirrors may be used to direct light between the substrates 552a, 552b.

In some examples, being that all components (e.g., active and passive) are contained on a single PIC, the size, weight, and power consumption of the digital measuring device 100 can be reduced. In one example, the dimensions of the PIC 150 are 3.5×7 mm; however, in other examples, the PIC 150 may be configured with different dimensions. As such, the digital measuring device 100 can be advantageously used in applications where a compact, high-performance non-contact position sensor is needed.

Figure 6A:
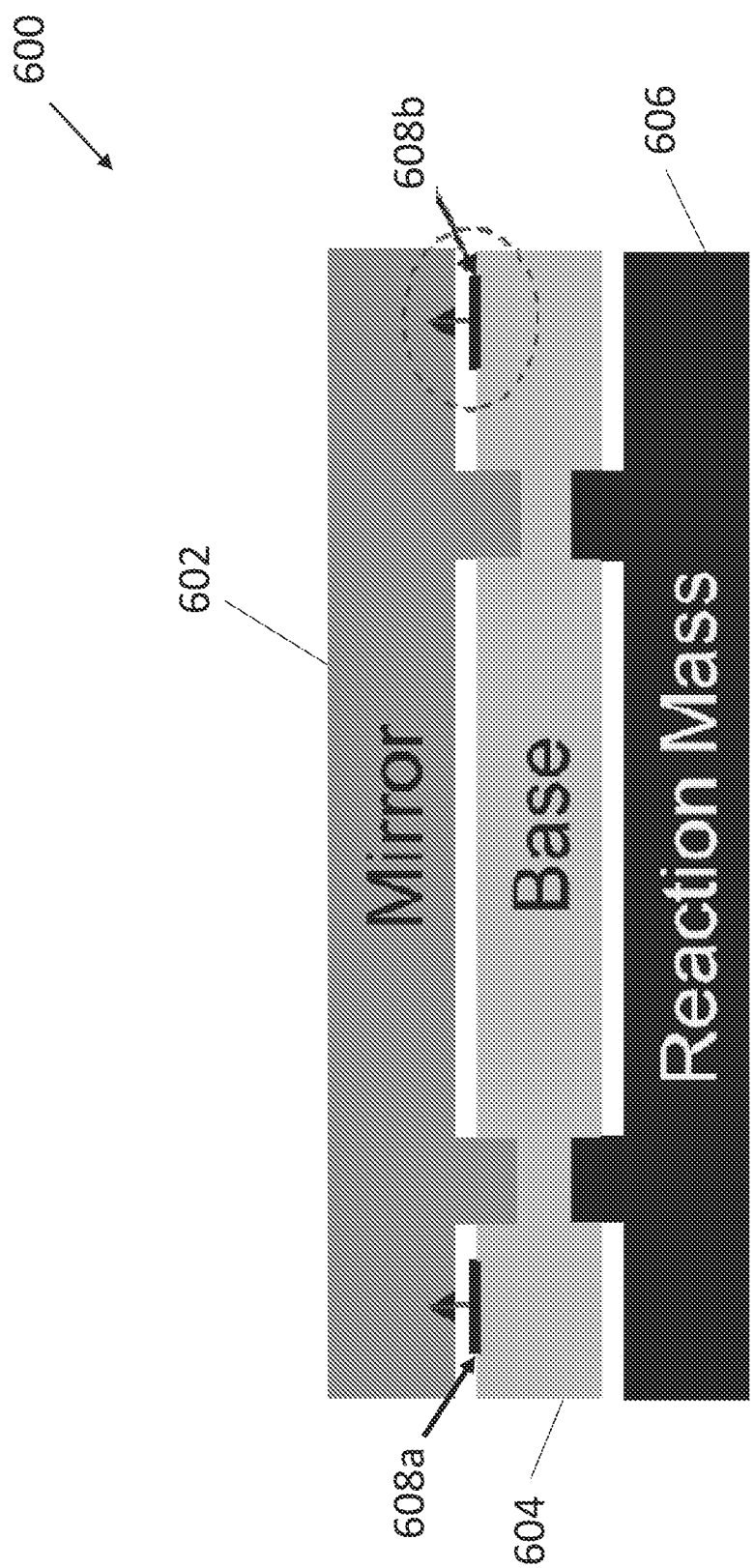
FIG. 6A is a diagram illustrating a fast steering mirror assembly in accordance with aspects described herein.

FIG. 6A illustrates a cross-sectional view of a fast steering mirror (FSM) assembly 600 in accordance with aspects described herein. In one example, the FSM assembly 600 is configured for use in flight/space applications including laser pointing, tracking, and image stabilization. As shown, the FSM assembly 600 includes a mirror 602, a base 604, and a reaction mass 606. In some examples, the base 604 includes one or more actuator components configured to adjust the position and/or angle of the mirror 602. The reaction mass 606 is attached to the base 604 and configured to stabilize the FSM assembly 600 to minimize the effect of disturbances/vibrations.

In one example, the FSM assembly 600 includes a first digital measuring device 608a and a second digital measuring device 608b. In some examples, the digital measuring devices 608a, 608b correspond to the digital measuring device 100 (or 200). The digital measuring devices 608a, 608b can be mounted and/or attached to the base 602 and configured to monitor the position of the mirror 602. In other examples, the FSM assembly 600 can be configured with a different number of digital measuring devices (e.g., 1, 3, etc.) to monitor the position of the mirror 602.

Figure 6B:
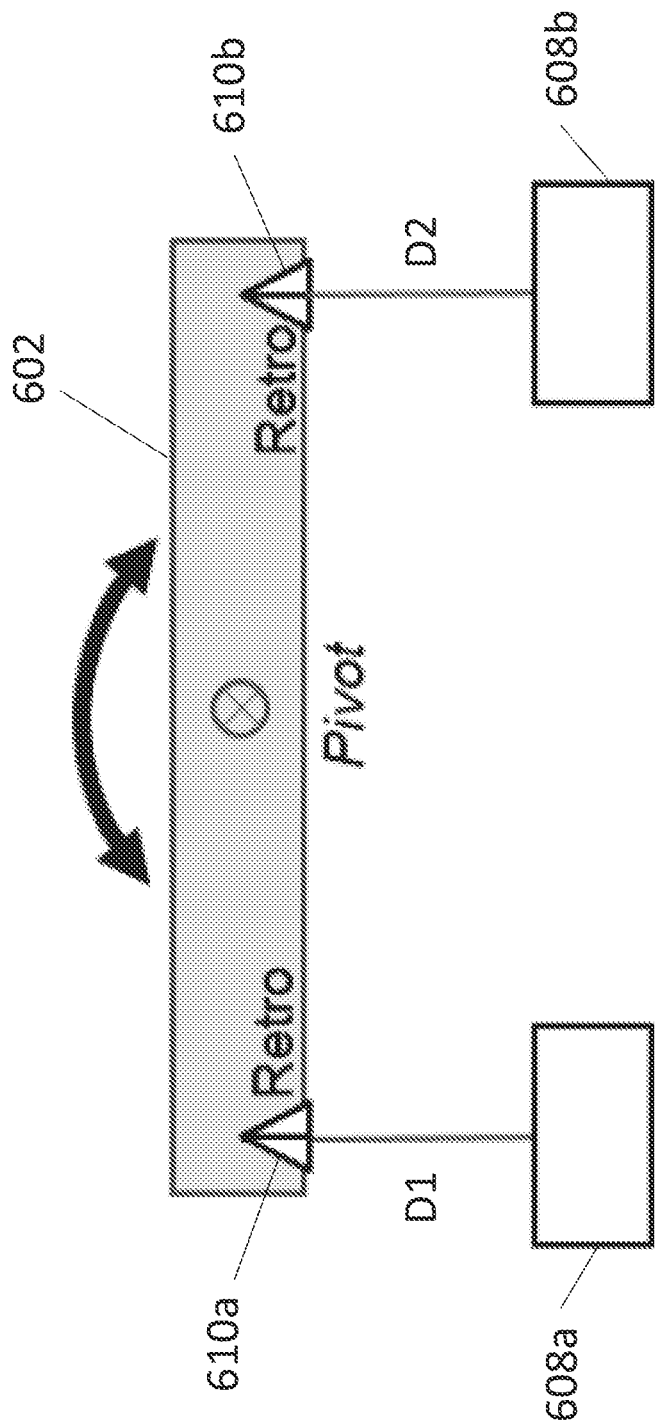
FIG. 6B is a diagram illustrating a fast steering mirror assembly in accordance with aspects described herein.

As shown in FIG. 6B, retro devices (i.e., reflectors) 610a, 610b can be positioned on the back side on the mirror 602 to create measurement paths between the mirror 602 and the digital measuring device 608a, 608b. In some examples, the retro devices 610a, 610b are hollow corner cube reflectors; however, in other examples, the retro devices 610a, 610b may be a different type of reflector (e.g., ball-type cat eye). In one example, the first digital measuring device 608a is configured to measure the distance D1 between itself (or the base 602) and the location of the retro device 610a. Likewise, the second digital measuring device 608b is configured to measure the distance D2 between itself (or the base 602) and the location of the retro device 610b.

In one example, a pair of measurement beams are provided to the retro devices 610a, 610b from the digital measuring devices 608a, 608b. As described above, the measurement beams are then reflected back, and the digital measuring devices 608a, 608b are configured to determine the distance to each of the retro devices 610a, 610b (i.e., D1 and D2). The position/orientation of the mirror 602 can then be derived from the distances between the retro devices 610a, 610b and the digital measuring devices 608a, 608b.

In some examples, by monitoring the position/orientation of the mirror 602, the accuracy of the FSM assembly 600 can be improved. For example, the monitored position of the mirror 602 may be used to verify and/or calibrate the actuated positions of the mirror 602. As described above, the digital measuring devices 608a, 608b are configured to operate over large angular ranges with improved resolution compared to other types of non-contact position sensors. As such, the distance measuring devices 608a, 608b can be used with FSMs that operate with increased angular ranges and/or high precision actuated positioning.

It should be appreciated that embodiments described herein are not limited to a particular type of non-contact position sensing. As described above, the digital measuring device 100 can be included in an FSM assembly to monitor the position of a mirror; however, in other examples, the digital measuring device 100 can be configured to monitor/measure the position of different types of actuated components. In some examples, the digital measuring device 100 can be used in different applications including optical coherence tomography, laser trackers position sensing, coordinate measuring machine position sensing, CNC machine head position sensing, automotive motion and vibration sensing, and fringe sensing for fiber-optic gyroscopes. In certain examples, the digital measuring device 100 can be configured as an active damping sensor and a microphone transducer.

As described above, an improved, compact non-contact position sensor is provided herein. In at least one embodiment, a multi-wavelength digital measuring device including a heterodyne interferometer is implemented on a photonic integrated circuit and configured to monitor the position of a moving object. In some examples, the digital measuring device is configured to monitor the position of a mirror included in a fast steering mirror (FSM) assembly.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A digital measuring device, the digital measuring device comprising:

a first ring resonator configured to produce a first frequency comb of light and direct at least a portion of the first frequency comb of light at an object;

at least one waveguide structure configured to combine a reference beam with light reflected from the object to produce a measurement beam;

a first multiplexer configured to split the measurement beam into a plurality of channels spaced in frequency;

a controller configured to measure a distance between the digital measuring device and the object based on the plurality of channels; and wherein the controller is further configured to determine the distance between the digital measuring device and the object by using an error metric to correlate the intensity values of the plurality of channels with sinusoidal intensity values.

2. The digital measuring device of claim 1, further comprising a plurality of detectors configured to detect an intensity value of each channel of the plurality of channels and provide the intensity values to the controller.

3. The digital measuring device of claim 2, wherein the digital measuring device is implemented on a photonic integrated circuit, the first ring resonator is integrated with a first substrate of the photonic integrated circuit, and the plurality of detectors is integrated with a second substrate of the photonic integrated circuit.

4. The digital measuring device of claim 3, wherein the first substrate is a Silicon Nitride (SiN) substrate and/or the second substrate is an Indium Phosphide (InP) substrate.

5. The digital measuring device of claim 1, wherein the digital measuring device is implemented on a photonic integrated circuit as a single substrate, and wherein the first ring resonator, the at least one waveguide structure, the first multiplexer, and the plurality of detectors are integrated with the substrate of the photonic integrated circuit.

6. The digital measuring device of claim 5, wherein the substrate is a Silicon Nitride (SiN) substrate or an Indium Phosphide (InP) substrate.

7. The digital measuring device of claim 1, further comprising a second ring resonator and the reference beam corresponds to a second frequency comb of light produced by the second ring resonator.

8. The digital measuring device of claim 7, wherein the first ring resonator is tuned with a first frequency offset value and the second ring resonator is tuned with a second frequency offset value, the second frequency offset value being different than the first frequency offset value.

9. The digital measuring device of claim 1, further comprising a second multiplexer and the reference beam corresponds to a portion of the first frequency comb of light combined by the second multiplexer.

10. The digital measuring device of claim 1, wherein the object is a mirror included in a fast steering mirror assembly.

11. A method for measuring a distance between a digital measuring device and an object, the method comprising:

producing a first frequency comb of light using a first ring resonator of the digital measuring device;

directing at least a portion of the first frequency comb of light at the object using the first ring resonator;

combining a reference beam and light reflected from the object to produce a measurement beam;

splitting the measurement beam into a plurality of channels spaced in frequency using a first multiplexer of the digital measuring device;

measuring the distance between the digital measuring device and the object based on the plurality of channels; and wherein measuring the distance between the digital measuring device and the object includes correlating the intensity values of the plurality of channels with sinusoidal intensity values using an error metric.

12. The method of claim 11 wherein measuring the distance between the digital measuring device and the object includes: iteratively solving the error metric by calculating an error distribution over a distance range; and analyzing the calculated error distribution to determine the distance between the digital measuring device and the object.

13. The digital measuring device of claim 3, wherein an edge of the first substrate is coupled to an edge of the second substrate.

14. The digital measuring device of claim 13, wherein light is directed between the first and second substrates via one or more mirrors included in the edges of the first and second substrates.

15. The digital measuring device of claim 1 wherein the controller is further configured to: iteratively solve the error metric by calculating an error distribution over a distance range; and analyze the calculated error distribution to determine the distance between the digital measuring device and the object.

16. A digital measuring device, the digital measuring device comprising:

a laser source configured to provide light;

a first ring resonator configured to produce a first frequency comb of light from the light provided by the laser source;

a local oscillator configured to provide a reference beam;

at least one waveguide structure configured to combine the reference beam with light reflected from an object to produce a measurement beam;

a multiplexer configured to split the measurement beam into a plurality of channels spaced in frequency; and a plurality of detectors configured to detect an intensity value of each channel of the plurality of channels, the intensity value of each channel of the plurality of channels corresponding to a distance between the digital measuring device and the object; and a controller configured to determine the distance between the digital measuring device and the object by using an error metric to correlate the intensity values of the plurality of channels with sinusoidal intensity values.

17. The digital measuring device of claim 16 wherein the controller is further configured to: iteratively solve the error metric by calculating an error distribution over a distance range; and analyze the calculated error distribution to determine the distance between the digital measuring device and the object.

* * * * *